(12) United States Patent
Cattaneo (10) Patent No.: US 10,010,175 B2
(45) Date of Patent: Jul. 3, 2018

(54) HIDDEN HANGING BRACKET FOR WALL CUPBOARDS

(71) Applicant: LEONARDO S.R.L., Figino Serenza, Como (IT)

(72) Inventor: Carlo Cattaneo, Como (IT)

(*) Notice: Subject to any disclaimer, the term of this patent is extended or adjusted under 35 U.S.C. 154(b) by 0 days.

(21) Appl. No.: 15/316,161

(22) PCT Filed: Jun. 5, 2015

(86) PCT No.: PCT/EP2015/001138
§ 371 (c)(1),
(2) Date: Dec. 3, 2016

(87) PCT Pub. No.: WO2015/197159
PCT Pub. Date: Dec. 30, 2015

(65) Prior Publication Data
US 2017/0135483 A1 May 18, 2017

(30) Foreign Application Priority Data
Jun. 23, 2014 (IT) .......................... MI2014A001138

(51) Int. Cl.
 *A47B 95/00* (2006.01)
 *F16M 13/00* (2006.01)
 *F16B 2/06* (2006.01)
 *F16M 13/02* (2006.01)

(52) U.S. Cl.
 CPC ............ *A47B 95/008* (2013.01); *F16B 2/065* (2013.01); *F16M 13/022* (2013.01)

(58) Field of Classification Search
 CPC ...... A47B 95/008; F16B 2/065; F16M 13/022
 USPC ......... 248/214, 215, 221.11, 222.14, 225.21, 248/323, 339, 340; 312/248
 See application file for complete search history.

(56) References Cited

U.S. PATENT DOCUMENTS

| 2,162,887 | A | * | 6/1939 | Hart | ........................ | A47B 33/00 |
| | | | | | | 108/152 |
| 5,718,493 | A | * | 2/1998 | Nikolai | ................ | A47B 95/008 |
| | | | | | | 312/245 |
| 9,027,893 | B2 | * | 5/2015 | Cheng | .................. | F16M 13/022 |
| | | | | | | 248/201 |
| 9,033,294 | B2 | * | 5/2015 | Cattaneo | .............. | A47B 95/008 |
| | | | | | | 248/221.11 |

(Continued)

FOREIGN PATENT DOCUMENTS

EP 2807954 3/2014
WO 2004032681 4/2004
(Continued)

*Primary Examiner* — Tan Le
(74) *Attorney, Agent, or Firm* — Themis Law (57) ABSTRACT

A hidden hanging bracket with an anti-disengagement system for wall cupboards, wherein a wall cupboard is hooked to a support fixed to the wall by a hooking tooth, includes, in combination: a base on which a slide runs, carrying a regulation mechanism in depth (horizontal) with a lead screw with which the hooking tooth is integral, a height regulation mechanism (vertical) with a lead screw, and a bead suitable for interfering with the support. The bead is screwed onto the slide in a position below and substantially opposing (not completely offset) with respect to the tooth, and the tip or end part of the bead is engaged with a flap (horizontal edge) folded directly from the support fixed to the wall.

8 Claims, 11 Drawing Sheets

(56) References Cited

U.S. PATENT DOCUMENTS

| 9,829,151 | B1* | 11/2017 | Stenhouse | F16M 13/022 |
| 2006/0091271 | A1* | 5/2006 | Nowak | A47B 95/008 |
| | | | | 248/225.21 |

FOREIGN PATENT DOCUMENTS

| WO | 2009077828 | 6/2009 |
| WO | 2010121687 | 10/2010 |
| WO | 2012084067 | 6/2012 |
| WO | 2012163441 | 12/2012 |

* cited by examiner

HIDDEN HANGING BRACKET FOR WALL CUPBOARDS

The present invention relates to a hidden hanging bracket with a perfected anti-disengagement system for wall cupboards, hooked to a support fixed to a wall, generally a metal bar or plate, suitably shaped.

As is well-known to skilled persons in the field, a system for constraining a cupboard to the wall envisages the use of a hidden hanging bracket device positioned behind the lining of the cupboard. Said hanging bracket comprises a hook which can be freely hooked to the above bar or plate fixed to the wall.

Two regulation mechanisms generally cooperate with said hook, for the regulation of the depth (horizontal) and height (vertical) of the hanging bracket, equipped with respective lead screws.

Hidden hanging brackets of this type are known, for example, from patents EP 1549177 and EP 2219495, and from European patent application EPA 11712481.8 to which reference should be made for any further clarifications and which should be considered as being an integral part of the present description.

When forces directed upwards are applied to the hooked cupboard, this can become unhooked from the support and fall, causing damage, also severe, not only to objects, but above all to people.

This possibility is currently even more probable, as the custom of assembling wall cupboards also at relatively low heights from the floor, is becoming more and more frequent, and, as mentioned above, this increases the risk of accidental disengagement, especially due to children.

In addition, safety regulations have entered, and will enter, into force in many countries, which require the provision of accidental anti-disengagement systems in wall cupboards.

European patent application EPA 10708147.3, filed on Mar. 5, 2010 in the name of the same Applicant, proposes a very satisfactory solution to the problem indicated above, for avoiding the accidental disengagement of a wall cupboard from its support, caused by forces directed upwards applied to the same cupboard.

According to European patent application EPA 10708147.3, to which reference should be made for clarifications and which should be considered as being an integral part of the present description, an anti-disengagement system is proposed for wall cupboards wherein a cupboard is fixed to the wall by means of a hook of a hanging bracket device, characterized in that releasable reciprocal constraint means are envisaged between said hook and said support.

It is also highly desirable and required to prevent the accidental disengagement of a wall cupboard from its support also due to horizontal forces, directed laterally with respect to the shoulders of the same cupboard, which can also be combined with vertical forces directed upwards.

European patent application EPA 14164730.5, filed on Apr. 15, 2014 in the name of the same Applicant, proposes an extremely satisfactory solution to the above problem for avoiding the accidental disengagement of the cupboard from its support, caused by horizontal forces, directed laterally with respect to the shoulders of the same cupboard, which can also be combined with vertical forces directed upwards.

According to European patent application EPA 14164730.5, to which reference should be made for clarifications and which should be considered as being an integral part of the present description, an anti-disengagement system for wall cupboards is proposed, wherein a cupboard is hooked to a support fixed to a wall by means of a hook of a hanging bracket device. Said disengagement system is of the type wherein releasable reciprocal constraint means are envisaged between said hook and said support. Said releasable reciprocal constraint means consist of a bead screwed onto said hook and suitable for interfering with said support; the system is characterized in that side blocking or stop elements cooperate with said bead, against side movements of the same bead caused by horizontal forces acting on said cupboard.

In order to prevent the accidental disengagement of the wall cupboard from the support caused by vertical and/or horizontal forces applied accidentally to the cupboard itself, a hidden hanging bracket has also been proposed, such as that described and illustrated in European patent application EPA 11712481.8 filed on Mar. 29, 2011 in the name of the same Applicant, to which reference should be made for clarifications and which should be considered an integral part of the present description.

In short, EPA 11712481.8 describes a hidden hanging bracket in which the two lead screws of the regulation mechanisms in depth (horizontal) and height (vertical) of the hanging bracket, and the bead of the anti-disengagement system are all assembled on a slide running on the base of the hanging bracket.

The bead of the anti-disengagement system is positioned between the two lead screws of the regulation mechanisms in depth and in height, above the hook of the hanging bracket, which is composed of the head of the same screw as the regulation mechanism in depth.

The anti-disengagement is actuated by the engagement between said bead and a window specifically formed by the supporting plate or bar of the cupboard to the wall.

Systems of this type have given extremely satisfactory results, but require a costly processing of the supporting plate of the cupboard to the wall, with considerable scraps of material.

An objective of the present invention is to provide a hidden hanging bracket which solves this problem.

Hanging brackets produced according to the teachings of European patent applications EPA 10708147.3 and EPA 14164730.5 have also provided completely satisfactory results and a further objective of the invention is to provide a hidden hanging bracket with an anti-disengagement system whose construction is even more simple and which does not complicate the assembly of the cupboard to the wall.

The assembly of the cupboard to the wall could be complicated by the fact that the bead of the anti-disengagement system (depending on its positioning) could encounter, during its screwing passage, the head of the fixing dowel or screw of the support fixed to the wall (bar or plate). In this case, the anti-disengagement system would not be activated, as the bead would not be able to interact correctly with the bar or plate fixed to the wall.

A further objective of the invention is therefore to exclude the possibility of such an occurrence.

Another objective of the invention is to provide a hidden hanging bracket with anti-disengagement system which can be easily released, i.e. which, in the case of necessity, allows the easy and rapid disassembly of the cupboard from the wall.

The objectives indicated above are achieved, according to the invention, by a hidden hanging bracket with a perfected anti-disengagement system as defined in the enclosed claims, the main and the dependent claims.

The structural and functional characteristics of the invention and its advantages with respect to the known art can be easily understood from the enclosed description, referring to the enclosed drawings, which show a possible exemplifying embodiment of a hidden hanging bracket with an anti-disengagement system for wall cupboards produced according the innovative principle of the invention.

With reference to the drawings, 10 indicates as a whole, a hidden hanging bracket device whose structure is of the type generally known, described for example in patent EPA 11712481.8.

The hanging bracket 10 comprises a movable hooking tooth 11 extending from a slide 12 running on a base 13.

Two regulation mechanisms (known) of the position in depth (horizontal) and height (vertical) of the tooth 11, are assembled on the slide 12, by means of respective lead screws 14, 15. The tooth 11 is integral with the free end of the screw 14, which can, for example, be in the form of a circular head.

The tooth 11 is destined for being hooked to a corresponding section 16 of a metallic bar 17 fixed to a wall 18 by means of dowels 19.

As can be clearly seen from the drawings, the section 16 of the bar 17, defines with the wall 18, a channel 20 in which the tooth 15 is housed. The bar 17, preferably and as an example, has a "C"-shaped section from whose upper wing AS the above-mentioned section 16 extends vertically. The bar 17, however, can have sections different from the "C"-shaped section illustrated, for example a section in which the lower wing AI of the "C" is missing, or also other sections.

An anti-disengagement system according to the invention, cooperates with the hooking tooth 11, and with the bar 17, which, in the embodiment shown in the drawings, consists of a bead 21 comprising a threaded section 22, a tip 23, and a shaped head 24 for a maneuvering tool, for example a screwdriver 25.

Said bead 21 is screwed into a threaded seat 26, formed directly on the slide 12. The bead 21 is substantially opposed, not completely offset, with respect to the tooth 11, at a substantially identical height "q".

More specifically, the axis of said bead 21 is substantially tangent to the circumference of the tooth 11.

According to the invention, the tip 23 (terminal part) of the bead 21, is engaged with a horizontal flap (edge) 16A, folded directly from the section 16 of bar 17.

In this way, side end stops 16B are automatically formed, without any additional costly operations, and without scraps of material, against which the hook 11 is buffered and blocked, in the case of a horizontal movement of the wall cupboard.

The hanging bracket device 10, produced as described above, is fixed to a wall cupboard, partially indicated with 29 and comprising shoulders 30, a top 31 and a lining 32. More specifically, in correspondence with the upper rear corners (right and left) of said cupboard 29, two of said hanging brackets 10, of which only one is shown, are fixed, behind the lining 32.

The functioning of the anti-disengagement system according to the invention is clearly illustrated in the operative sequence of FIGS. 1-9 and, is briefly the following.

Figure 1:
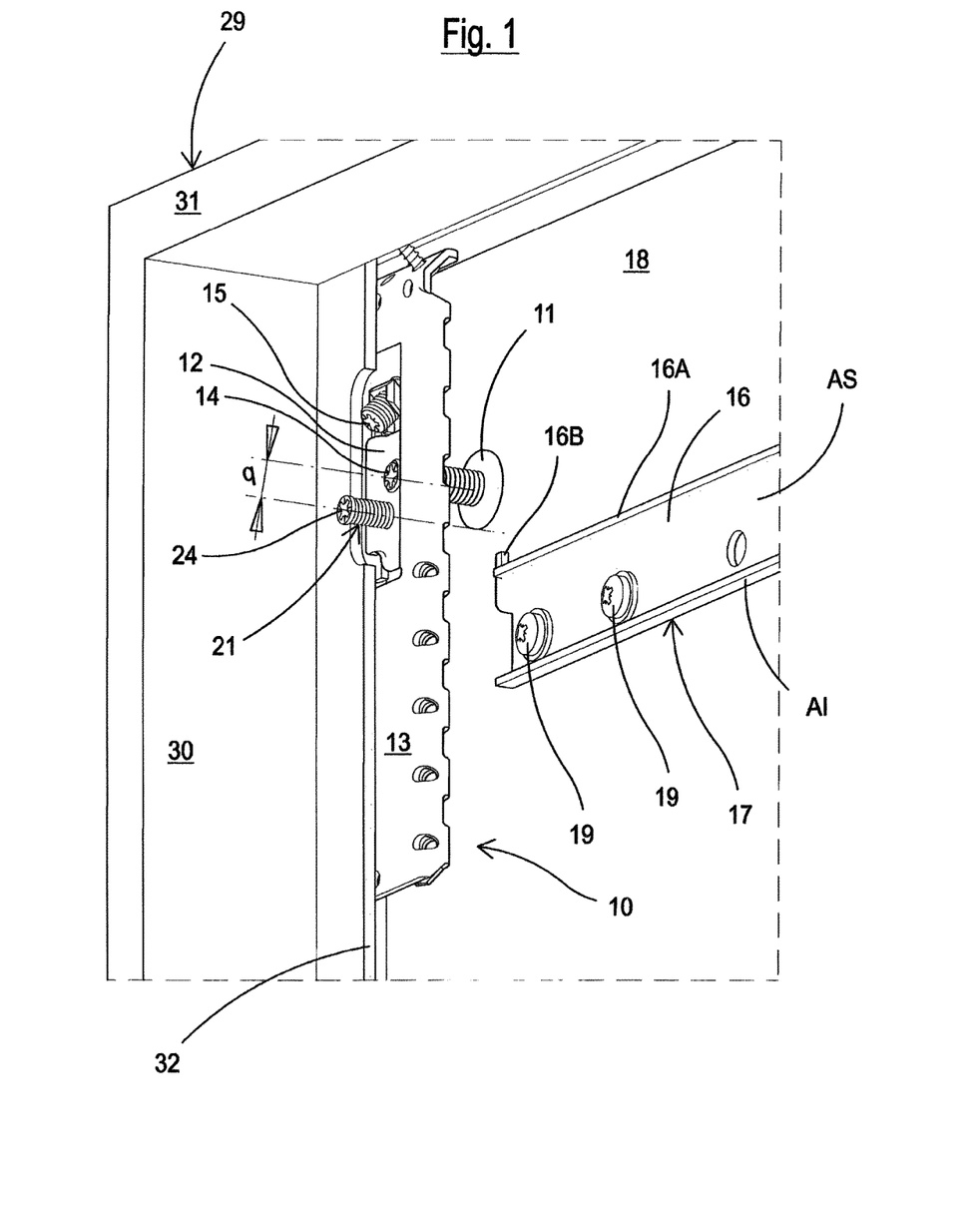
FIG. 1 is a perspective view illustrating a possible embodiment of a hidden hanging bracket with an anti-disengagement system according to the invention with the cupboard in the hooking phase to a supporting bar fixed to the wall.
Figure 2:
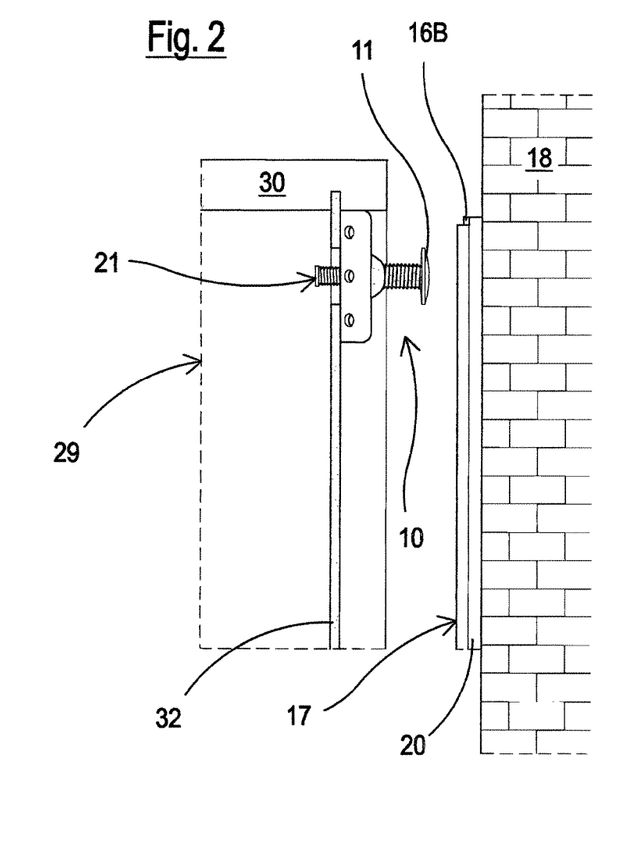
FIG. 2 is a detail in a plan section of the cupboard of FIG. 1.
Figure 3:
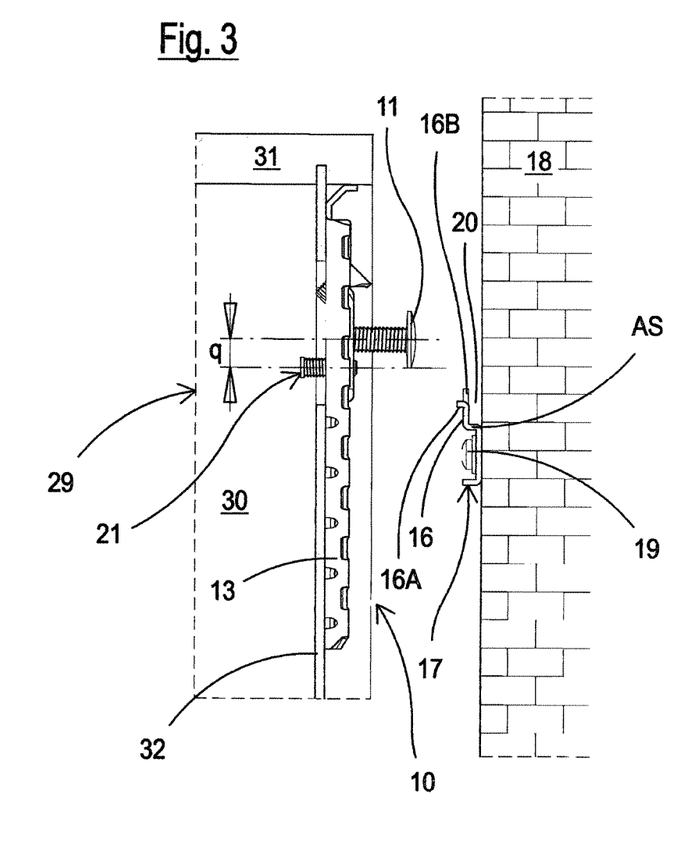
FIG. 3 is a detail in a vertical section of the cupboard of FIG. 1.
Figure 4:
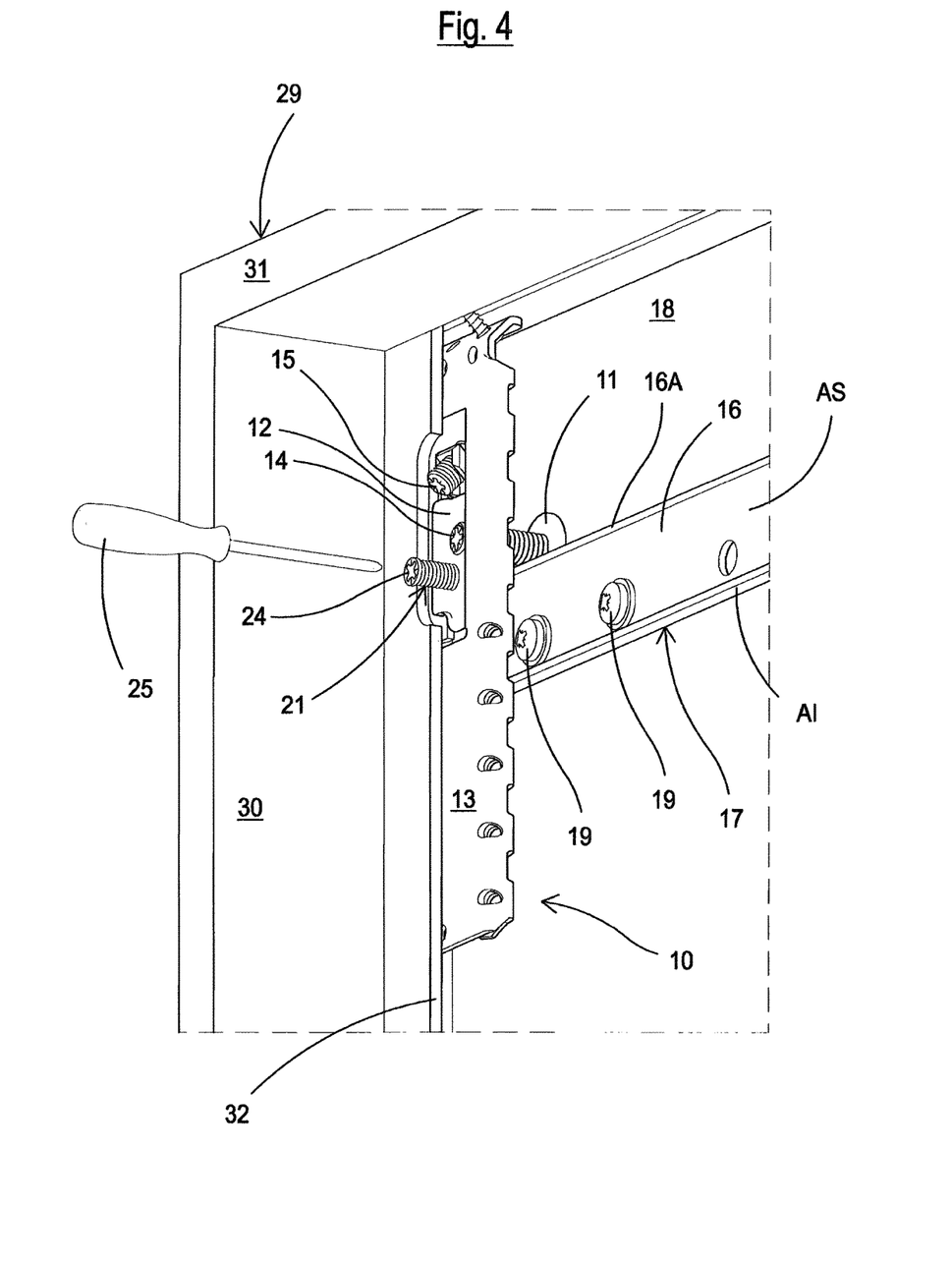
FIG. 4 is a perspective view similar to FIG. 1 illustrating the hanging bracket hooked to the bar fixed to the wall, but with the anti-disengagement system not yet activated (actuated)
Figure 5:
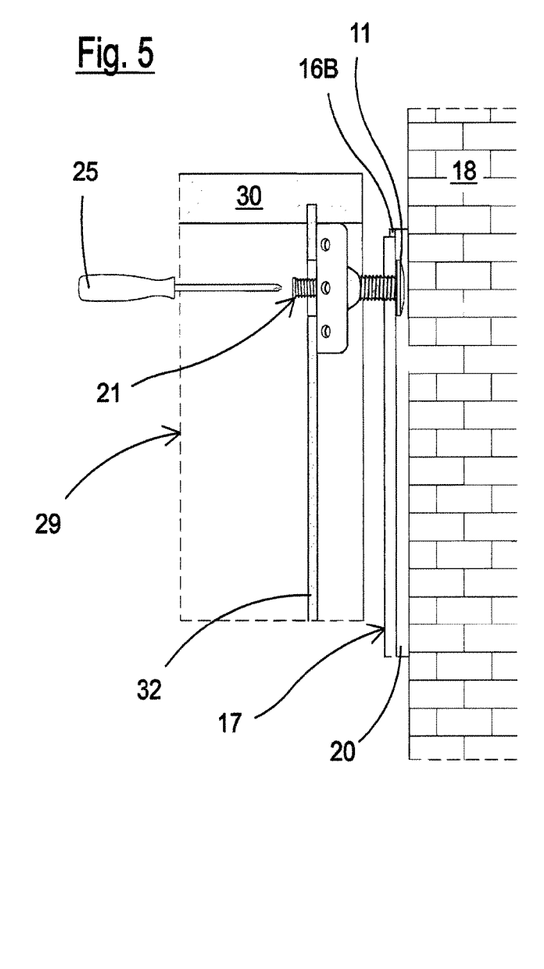
FIG. 5 is a detail in a plan section of the cupboard of FIG. 4.
Figure 6:
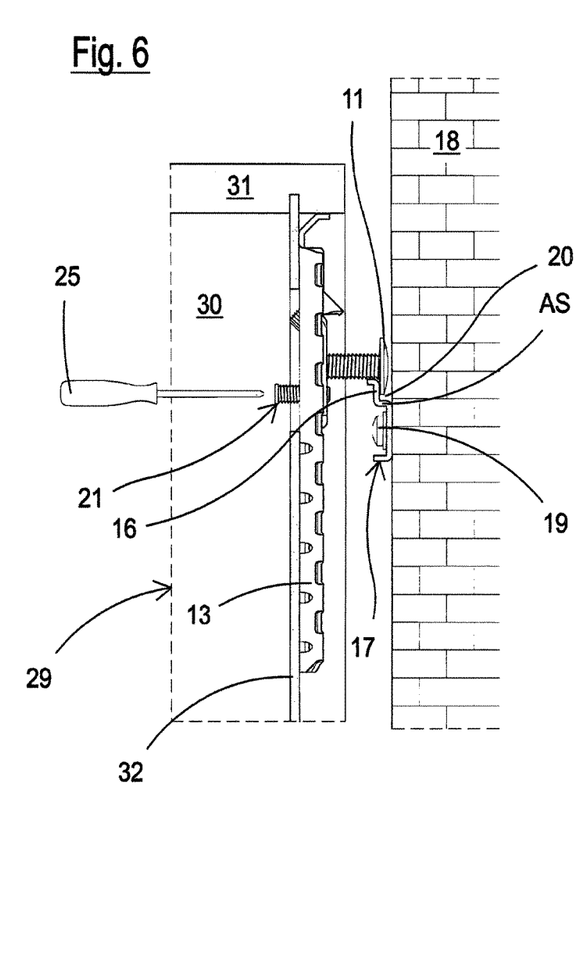
FIG. 6 is a detail in a vertical section of the cupboard of FIG. 4.

The cupboard is hooked to the wall 18, with the screw 21 in a withdrawn non-operative position shown in FIGS. 1-6, by inserting the tooth 11 in the channel 20 (FIGS. 4-6). In this way, due to the weight of the cupboard 29, the tooth 11 is engaged with the section 16 of the bar 17 (FIGS. 4-6).

Figure 7:
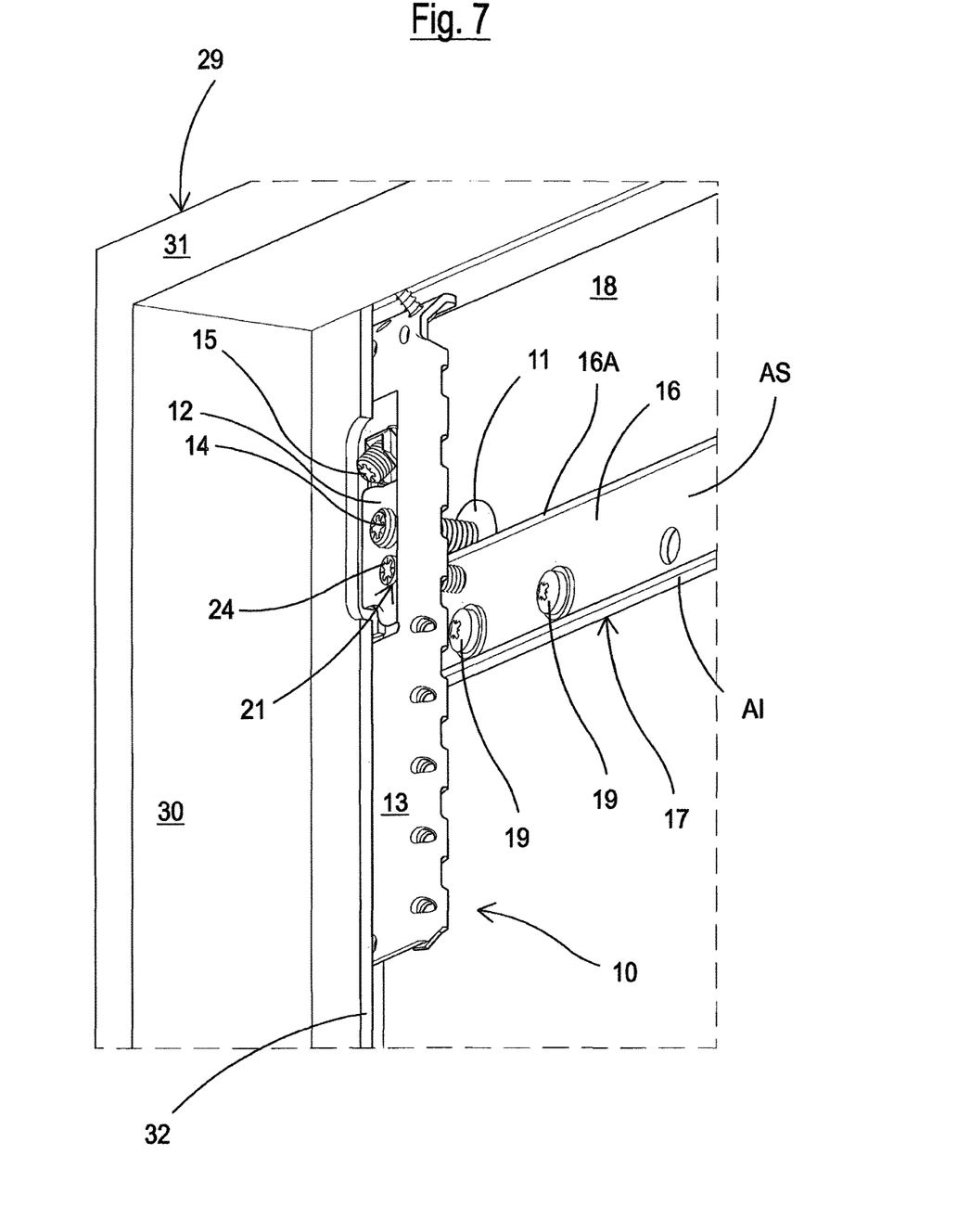
FIGS. 7, 8 and 9 are views similar to FIGS. 4, 5 and 6, respectively, illustrating the anti-disengagement system in the activated blocking position to the wall of the cupboard.
Figure 8:
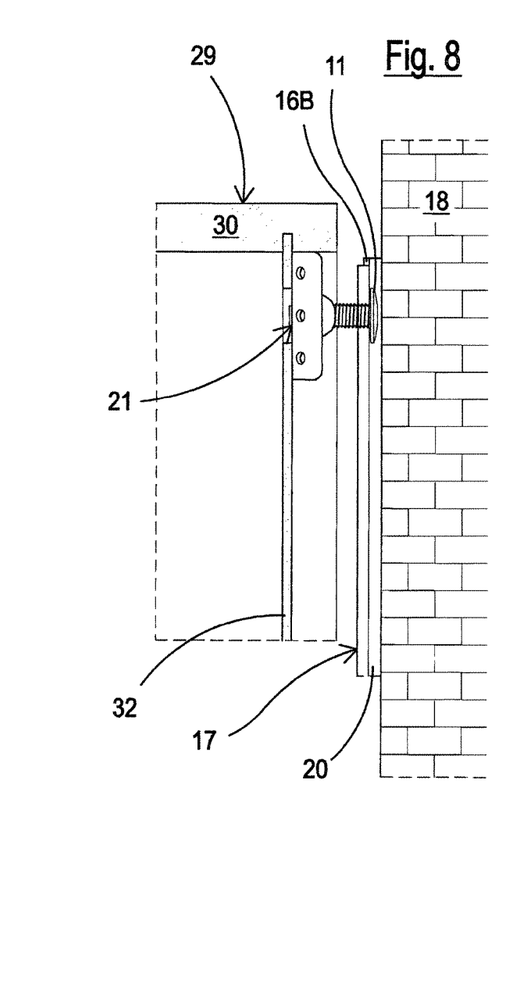
Figure 9:
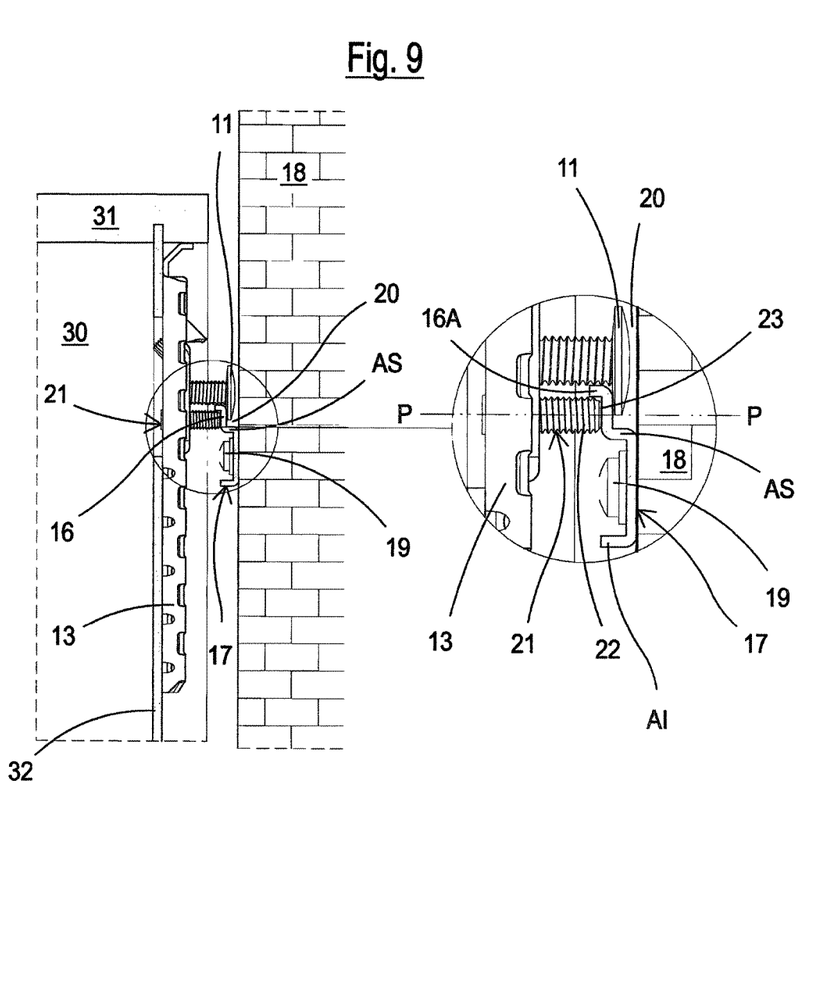
Figures 10, 11:
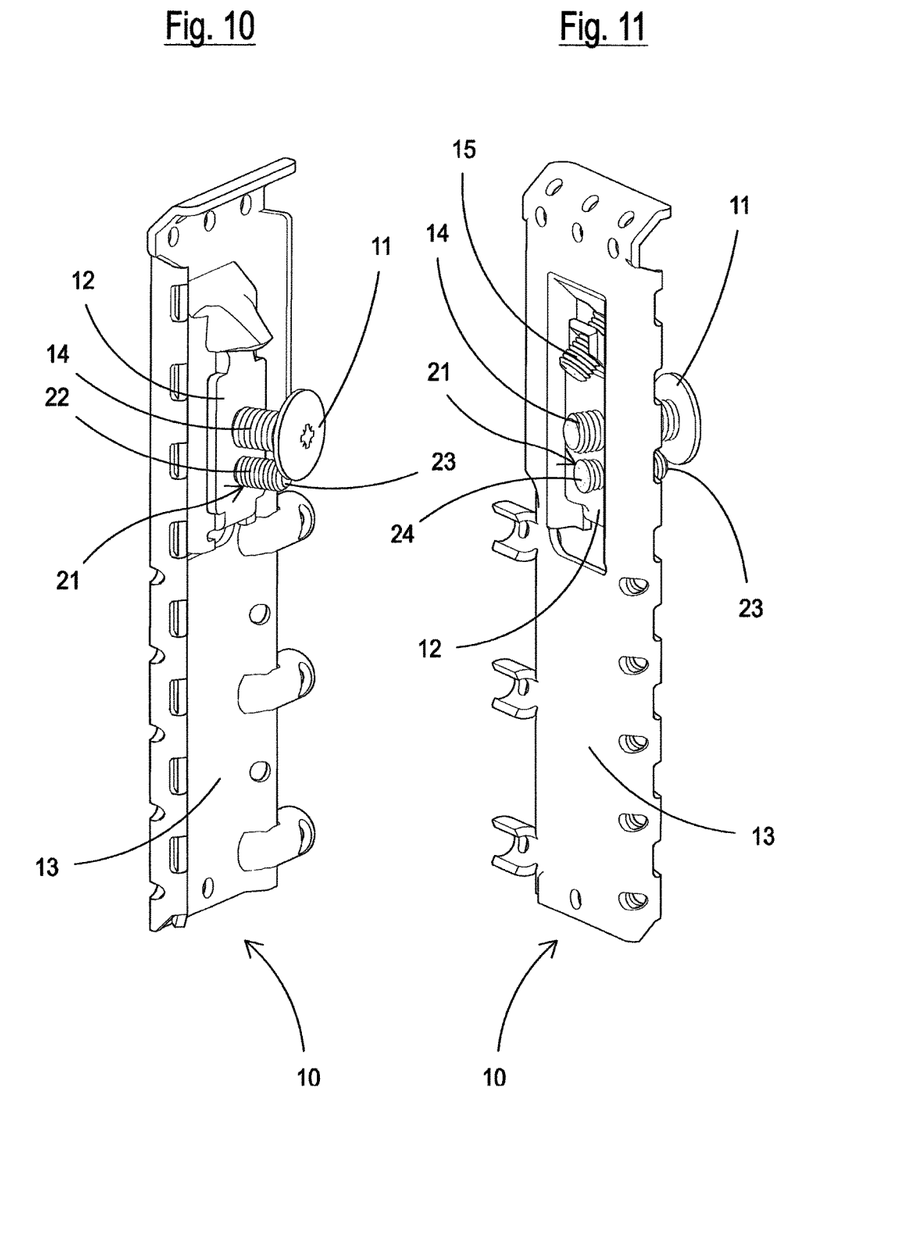
FIGS. 10 and 11 are two perspective views illustrating the hanging bracket of the invention from the two opposite sides, respectively.
Figures 12, 13:
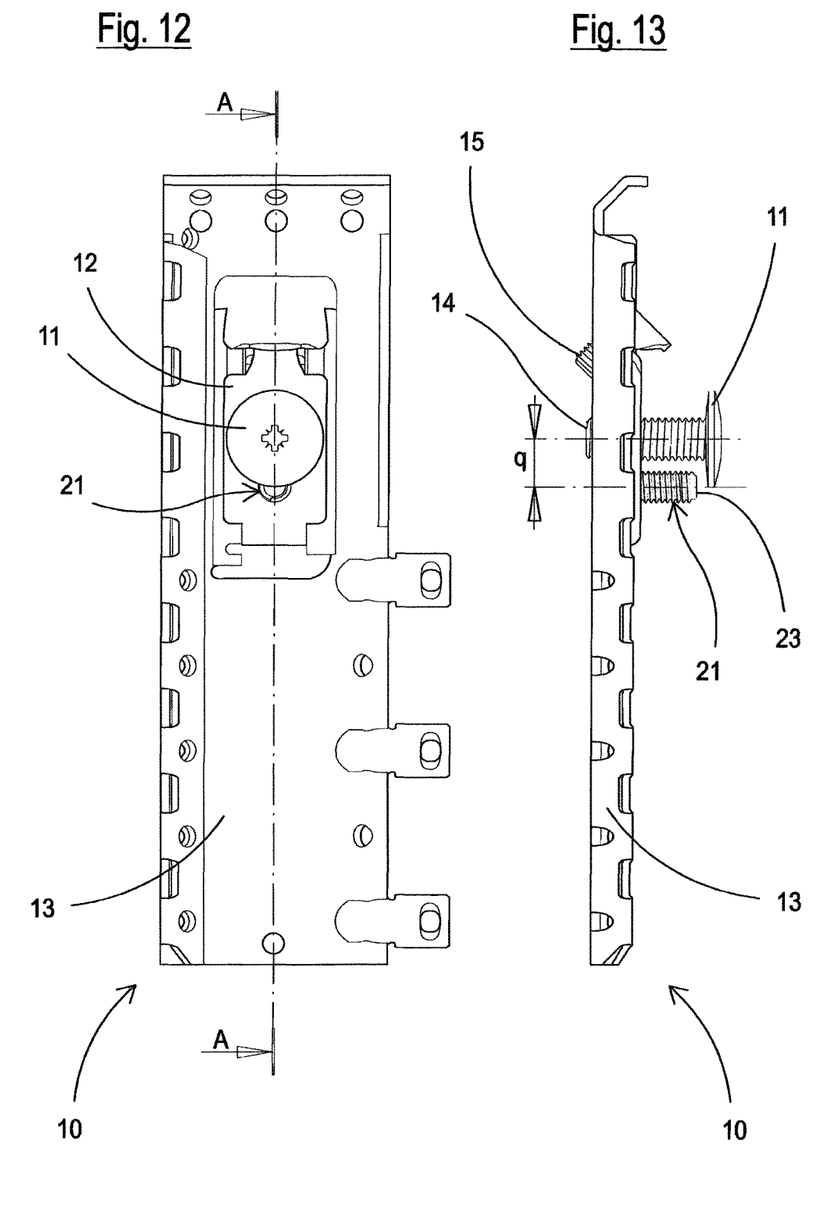
FIG. 12 is a raised front view of the hanging bracket.
FIG. 13 is a raised side view of the hanging bracket.
Figure 14:
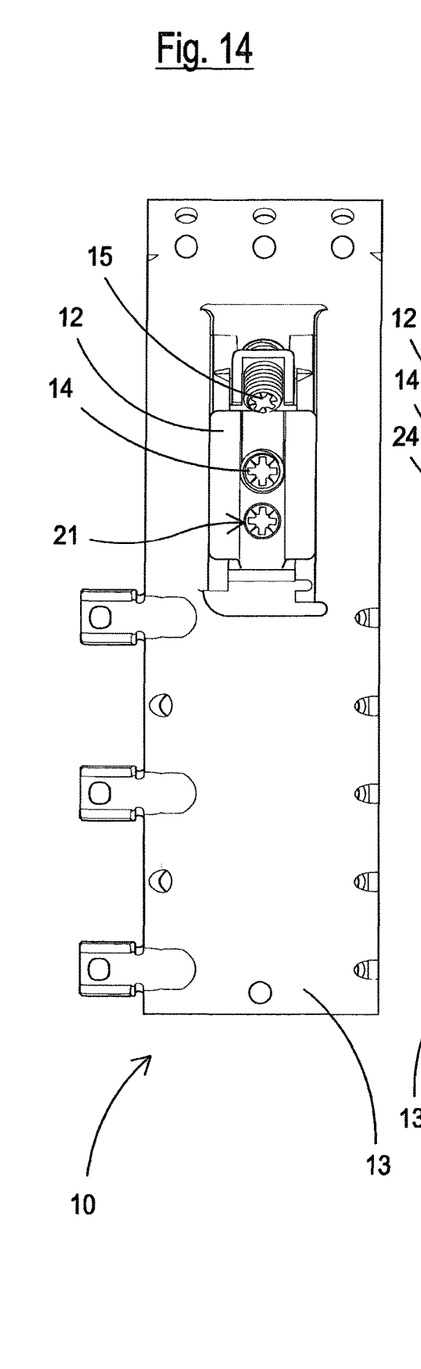
FIG. 14 is a raised view of the rear side of the hanging bracket.
Figure 15:
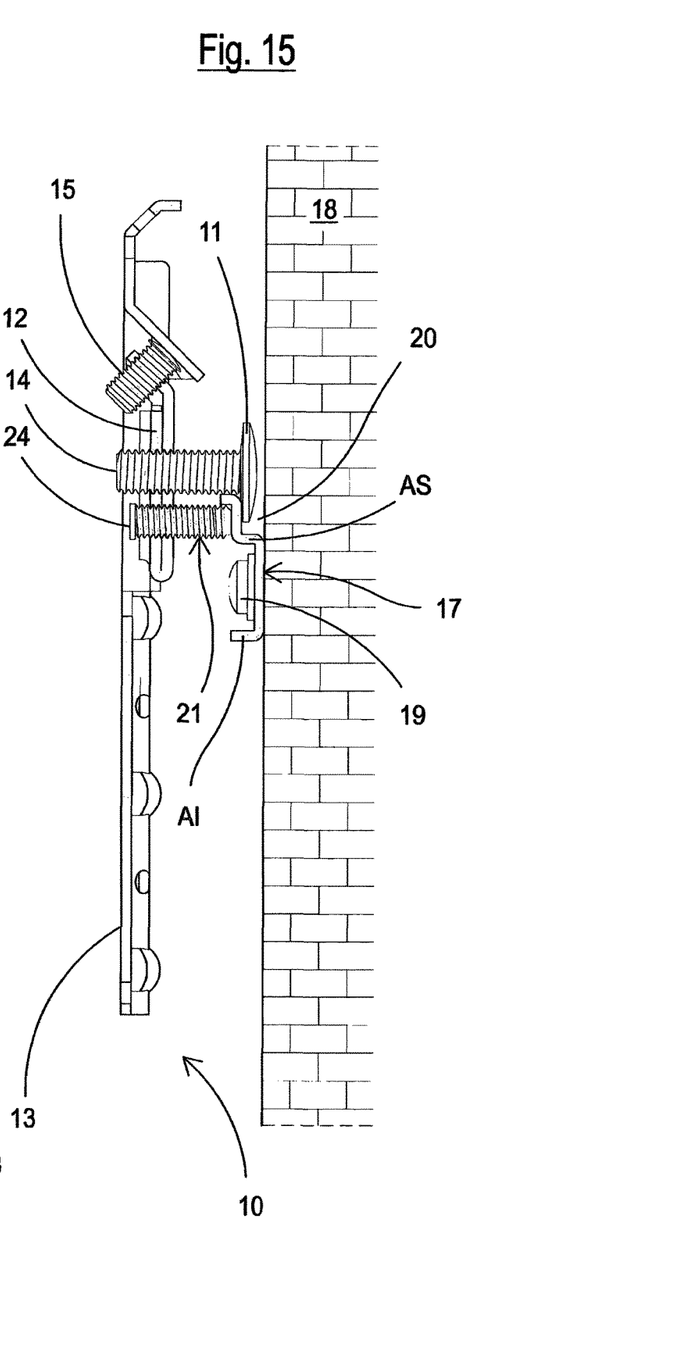
FIG. 15 is a vertical section according to the line A-A of the hanging bracket hooked to a support fixed to the wall.
Figure 16:
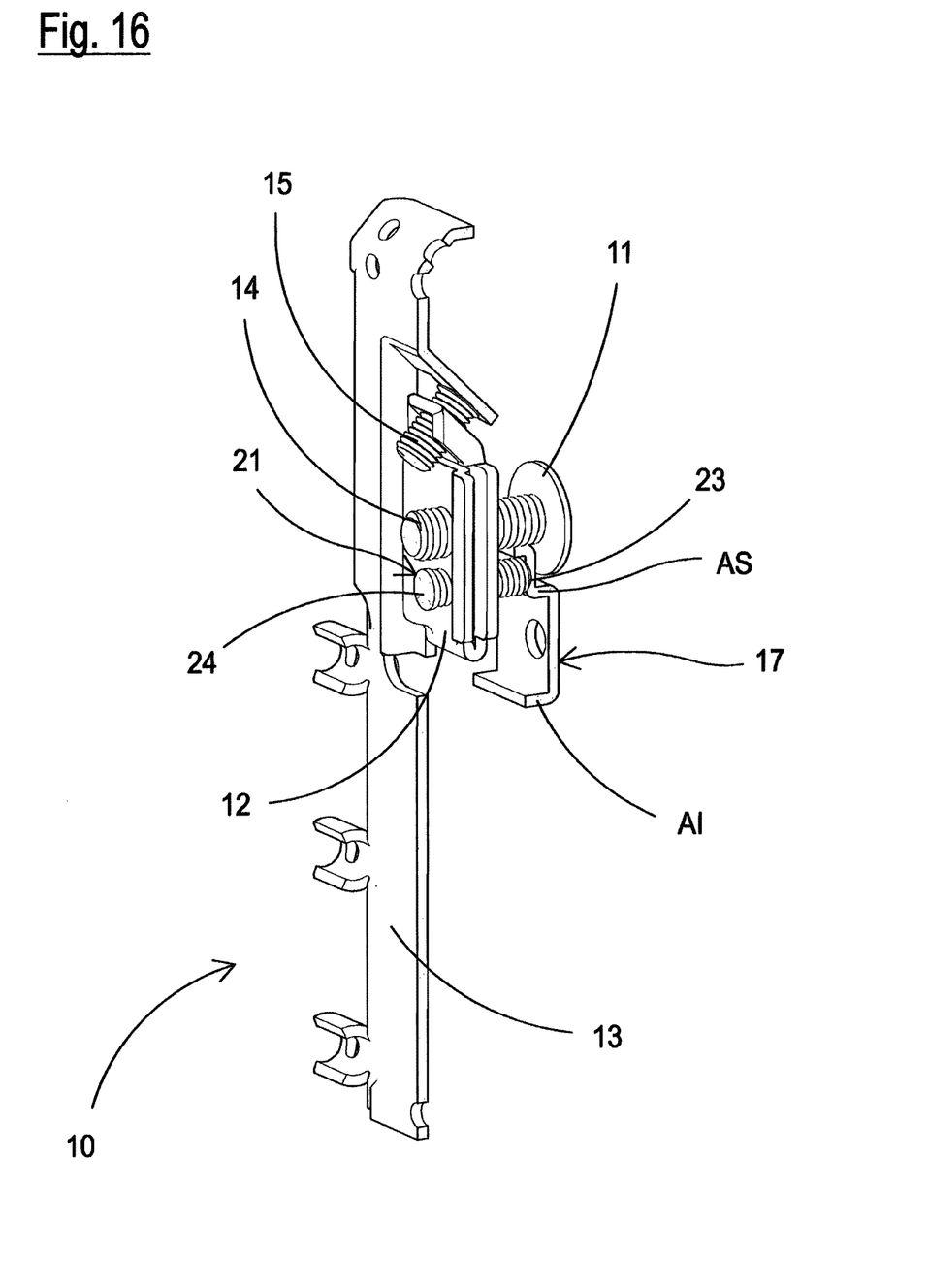
FIG. 16 is a partial cross-sectional perspective view of the hanging bracket in the condition of FIG. 15.

With the cupboard 29 thus positioned, after effecting both regulations in depth and in height, the bead 21 is screwed, by means of the screwdriver 25, into the operative forward position of FIGS. 7-9, so as to bring the tip or terminal end 23 in engagement with the undercut formed by the horizontal flap 16A of the bar 17.

Once the system has been activated, the bead 21 typically lies on a plane P which is positioned under said flap 16A, and substantially above said wing AS (FIG. 9).

In this way, it is evident that, in the case of the accidental application to the cupboard 29 of forces directed upwards, the interference between the bead 21 and the flap 16A prevents the disengagement of the tooth 11 from the section 16 of the bar 17.

Furthermore, the presence of the side blocking stops 16B, between which the tooth 11 is positioned, prevents the cupboard 29 from falling, when subjected to accidental side forces, which could disengage the tooth 11 from channel 20 of the bar 17, causing the cupboard to fall.

In the case of necessity, on the contrary, the desired disengagement of the tooth 11 from the section 16 of the bar 17, is obtained by simply unscrewing the bead 21, so as to bring it back to the withdrawn non-operative position of FIGS. 1-6.

Figure 17:
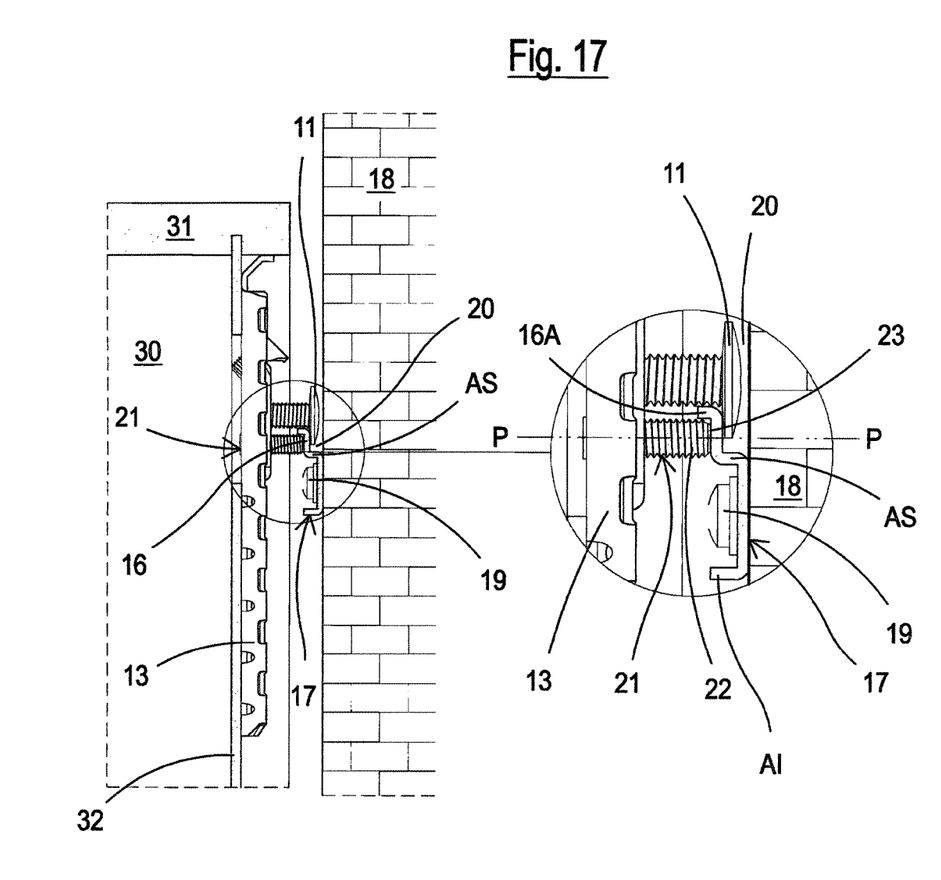
FIG. 17 is a vertical section illustrating an anti-disengagement system according to the known art, wherein the blocking screw cannot become operational as it interferes with the head of the fixing screw or dowel to the wall of the plate itself on which the cupboard is hooked.

The objectives mentioned in the preamble of the description have therefore been achieved, in particular the extremely important objective of preventing the bead or screw 21 of the anti-disengagement system from encountering, during its screwing passage, the head of the fixing dowel or screw 19 of the support 17 (bar or plate), on the wall, as indicated in FIG. 17, which would make the same system ineffective, as the terminal part of the bead 21 could not become engaged with the undercut 16A of the support 17 defined by the upper wing AS of the "C". In this respect, it should be noted that the hanging brackets, for evident reasons of loading resistance, are hooked above the fixing dowels or screws 19 of the support to the wall. This drawback can arise in the anti-disengagement systems according to the known art, consisting, for example of EPA 14164730.5

The protection scope of the present invention is defined by the enclosed claims.

The invention claimed is:

1. A hidden hanging bracket (10) with an anti-disengagement system for wall cupboards to be fixed to a wall (18), the hanging bracket comprising, in combination:
    a base (13) on which a slide (12) runs, the slide (12) carrying a regulation mechanism of horizontal depth having a first lead screw (14), said first lead screw having at one end, and being integral with, a hooking tooth;
    a support (17) adapted to be attached to the wall, the hooking tooth engaging the support;
    a vertical height regulation mechanism comprising a second lead screw (15) coupled to the slide; and
    a dowel (21) configured for interfering with said support (17),
    wherein said dowel (21) is screwed onto said slide (12) in a position in which said dowel faces perpendicularly said bracket and is opposing, but not completely offsetting, a movement of said tooth with respect to said support, and
    wherein a tip or end part (23) of said dowel engages a flap (16A) defining a horizontal edge of said support, said flap being folded directly from said support (17) fixed to the wall (18).

2. The hanging bracket according to claim 1, wherein said dowel (21) is positioned at a height (q) substantially identical to a height of said tooth (11).

3. The hanging bracket according to claim 1, further comprising side end-stops (16B) formed at ends of said support (17).

4. The hanging bracket according to claim 1, wherein said tooth (11) becomes hooked to a corresponding section (16) of said support (17), said section (16) defining, with said wall (18), a channel (20), where the tooth (11) becomes housed, and wherein said horizontal flap (16A) is folded from said section (16).

5. The hanging bracket according claim 4, wherein said support (17) has a "C"-shaped section, from whose upper wing (AS) said section (16) extends vertically, said horizontal edge (16A) being folded from said section.

6. The hanging bracket according to claim 5, wherein said dowel (21) lies on a plane (P), which is situated below said flap (16A) and above said wing (AS).

7. The hanging bracket according to claim 1, further comprising a first regulation mechanism in the horizontal depth and a second regulation mechanism in the vertical height, each of the first and second regulation mechanisms having a lead screw (14 and 15).

8. The hanging bracket according to claim 2, wherein said tooth (11) is shaped as a circular head integral with said screw (14), and wherein an axis of said dowel (21) is substantially tangent with respect to a circumference of said circular head defining said tooth (11).

* * * * *